(12) United States Patent
Etoh (10) Patent No.: US 9,264,647 B2
(45) Date of Patent: Feb. 16, 2016

(54) TELEVISION RECEIVER APPARATUS

(75) Inventor: Masayuki Etoh, Osaka (JP)

(73) Assignee: SHARP KABUSHIKI KAISHA, Osaka-shi (JP)

( * ) Notice: Subject to any disclaimer, the term of this patent is extended or adjusted under 35 U.S.C. 154(b) by 79 days.

(21) Appl. No.: 14/130,697

(22) PCT Filed: Apr. 2, 2012

(86) PCT No.: PCT/JP2012/058862
§ 371 (c)(1),
(2), (4) Date: Jan. 3, 2014

(87) PCT Pub. No.: WO2013/011719
PCT Pub. Date: Jan. 24, 2013

(65) Prior Publication Data
US 2014/0133827 A1 May 15, 2014

(30) Foreign Application Priority Data
Jul. 15, 2011 (JP) ................................. 2011-156203

(51) Int. Cl.
| | |
|---|---|
| *H04N 5/775* | (2006.01) |
| *H04N 5/50* | (2006.01) |
| *H04N 21/41* | (2011.01) |
| *H04N 21/4363* | (2011.01) |
| *H04N 21/443* | (2011.01) |
| *H04N 5/63* | (2006.01) |

(52) U.S. Cl.
CPC . *H04N 5/50* (2013.01); *H04N 5/63* (2013.01); *H04N 5/775* (2013.01); *H04N 21/4122* (2013.01); *H04N 21/4135* (2013.01); *H04N 21/43637* (2013.01); *H04N 21/4436* (2013.01)

(58) Field of Classification Search
CPC .................................................. H04N 21/4126
USPC .......................................................... 386/230
See application file for complete search history.

(56) References Cited

U.S. PATENT DOCUMENTS

2006/0267894 A1* 11/2006 Tokimoto ......................... 345/90
2007/0249395 A1* 10/2007 Kondo et al. ............... 455/556.1
2009/0317055 A1* 12/2009 Iwami .............................. 386/83

FOREIGN PATENT DOCUMENTS

| JP | 2006-254013 A | 9/2006 |
|---|---|---|
| JP | 2007-13295 A | 1/2007 |
| JP | 2007-19774 A | 1/2007 |
| WO | WO 2008/035653 A1 | 3/2008 |

\* cited by examiner

*Primary Examiner* — Hung Dang
*Assistant Examiner* — Girumsew Wendmagegn
(74) *Attorney, Agent, or Firm* — Birch, Stewart, Kolasch & Birch, LLP (57) ABSTRACT

Provided is technology avoiding situation where content cannot be viewed in the middle, due to insufficient amount of power remaining in a battery, in a television having a monitor unit separated from a tuner unit. A location free TV 1 includes an STB 10 and a monitor unit 30 separately, as independent configurations. Broadcasting received by the STB 10 is wirelessly transmitted to the monitor unit 30, and displayed on the monitor unit 30. The STB 10 is connected to an external recorder 94 and an external storage 96 in a recordable, playable state. Connection to a network storage 92 is performed via a network 90 in a recordable, playable state. The location free TV 1 has general TV functions, and, when insufficient amount of power remains in a battery of the monitor unit 30, a viewed program is recorded in the external recorder 94 etc., via the STB 10.

2 Claims, 6 Drawing Sheets

TELEVISION RECEIVER APPARATUS

TECHNICAL FIELD

The present invention relates to a television receiver apparatus, and relates to a television receiver apparatus configured to have a tuner unit thereof separated from a monitor unit thereof.

BACKGROUND ART

In recent years, a television receiver apparatus (hereinafter, simply also referred to as a "television") has become thinner and more lightweight, and in order to be portable even if a display size is in a 20-inch class and to enable being viewed everywhere, a location free TV configured from a monitor unit mounted with a battery and an STB (Set Top Box) provided with a tuner unit to communicate with the monitor unit has been commercialized.

When a user performs using (viewing) by the battery for a long period of time, such a case is assumed that an amount of power remaining in the battery of the monitor unit is run out in the middle of a program being viewed and the program which has been viewed becomes unable to be viewed to the last. In a mobile device such as a mobile phone, various technologies have been proposed as to processing when the amount of power remaining in the battery becomes small. For example, a technology is disclosed that copes with a problem that, in viewing of a television program in a mobile phone device with a television receiving function, due to causes such as responding to an incoming phone call and reduction in the battery, a program being viewed is missed (for example, refer to Patent Literature 1). In this technology, when an incoming phone call is responded during viewing a television program to interrupt the viewing, recording is automatically performed in a memory recording apparatus built in a terminal. Further, when the amount of power remaining in the battery is reduced to make the terminal difficult to continue recording on its own, switching is automatically made to a remote recording mode to continuously perform recording in a remote recording apparatus at home or the like. In addition, there is also a technology that, in a mobile terminal apparatus provided with a television function, when it is judged that it is difficult to view a television continuously until a program ends with reduction in a battery, video and sound output with large amounts of battery consumption is stopped to move to recording processing (for example, refer to Patent Literature 2).

CITATION LIST

Patent Literature

PATENT LITERATURE 1: Japanese Laid-Open Patent Publication No. 2006-254013
PATENT LITERATURE 2: Japanese Laid-Open Patent Publication No. 2007-19774

SUMMARY OF INVENTION

Technical Problems

In the meantime, it is assumed that, in a so-called location free television which has been proposed based on the concept enabling viewing everywhere or the like, a viewing aspect for driving a monitor unit with a battery is a main usage state. Accordingly, there is a situation where the amount of power remaining in the battery becomes insufficient during viewing a program. In the technology disclosed in Patent Literature 1, when the amount of power remaining in the battery is reduced so that a device is not able to continue recording on its own, switching is made to the remote recording mode to continuously perform recording in the remote recording apparatus at home or the like, but what processing is to be performed is not disclosed and a specific technology has been required to be introduced. Moreover, the technology disclosed in Patent Literature 1 assumes a product that a television/recording function is added to a mobile phone, therefore has a case where a status of usage is different from a product like the location free television, and is not always able to be adopted. Thus, other technology suitable for a product like the location free television has been required. Further, in the technology disclosed in Patent Literature 2, processing is performed so that recording becomes possible at a maximum within the amount of power remaining in the battery, but a mobile phone is assumed, so that when being applied to a product focusing on a television function, substantial limitation is generated in recordable time. That is, since a usage aspect of a user is different, it is also assumed that a request of recording a program which continues for a few hours is increased, but it has been impossible to always respond to such a request. Moreover, there is a problem that, when processing for recording until a program ends is started, the user needs to stop viewing at that time.

The present invention has been made in view of circumstances described above, and aims to provide a technology for solving the above-described problems.

Solution to Problem

The present invention is a television receiver apparatus in which a monitor unit having portability and driven with a battery and a tuner unit are provided separately, and transmission of content is performed wirelessly from the tuner unit to the monitor unit, including a battery managing unit for detecting an amount of power remaining in the battery provided in the monitor unit; and a record managing unit for recording the content which is received by the tuner and transmitted to the monitor unit in a built-in or external recording apparatus as well as recording information of recording responding to the case of battery exhaustion in association with the recording when the amount of power remaining in the battery is less than a predetermined amount.

Moreover, the battery managing unit may instruct the record managing unit to start recording when the amount of power remaining in the battery is less than the predetermined amount.

Moreover, when it is set to view the content which is received by the tuner and transmitted to the monitor unit to the last, the record managing unit may judge whether or not the amount of power remaining in the battery is sufficient, and when determining as being insufficient, record the content.

Moreover, the record managing unit may select the recording apparatus to be used according to storage capacity needed for recording the content.

Moreover, when the content that is recorded as the amount of power in the battery is less than the predetermined amount exists, and when driving by AC power is started from a state where the monitor unit is turned off, the record managing unit may play the recorded content.

Moreover, when the content that is recorded as the amount of power in the battery is less than the predetermined amount exists, and when driving by AC power is started from a state where the monitor unit is turned off, the record managing unit may perform chasing playback when content same as the recorded content is being received.

Moreover, when the content that is recorded as the amount of power in the battery is less than the predetermined amount exists, and when display output of the content in the monitor unit is performed to the last, the record managing unit may delete the recorded content.

Moreover, when the content that is recorded as the amount of power in the battery is less than the predetermined amount exists, and when driving by AC power is started from a state where the monitor unit is turned on, the record managing unit may stop recording of the content being recorded for deleting.

Advantageous Effects of Invention

According to the present invention, it is possible to provide a technology, whereby a situation in which content becomes unable to be viewed in the middle of viewing thereof, due to insufficient amount of power remaining in a battery, is avoided, in a television configured to have a monitor unit thereof separated from a tuner unit thereof.

DESCRIPTION OF EMBODIMENTS

Figure 1:
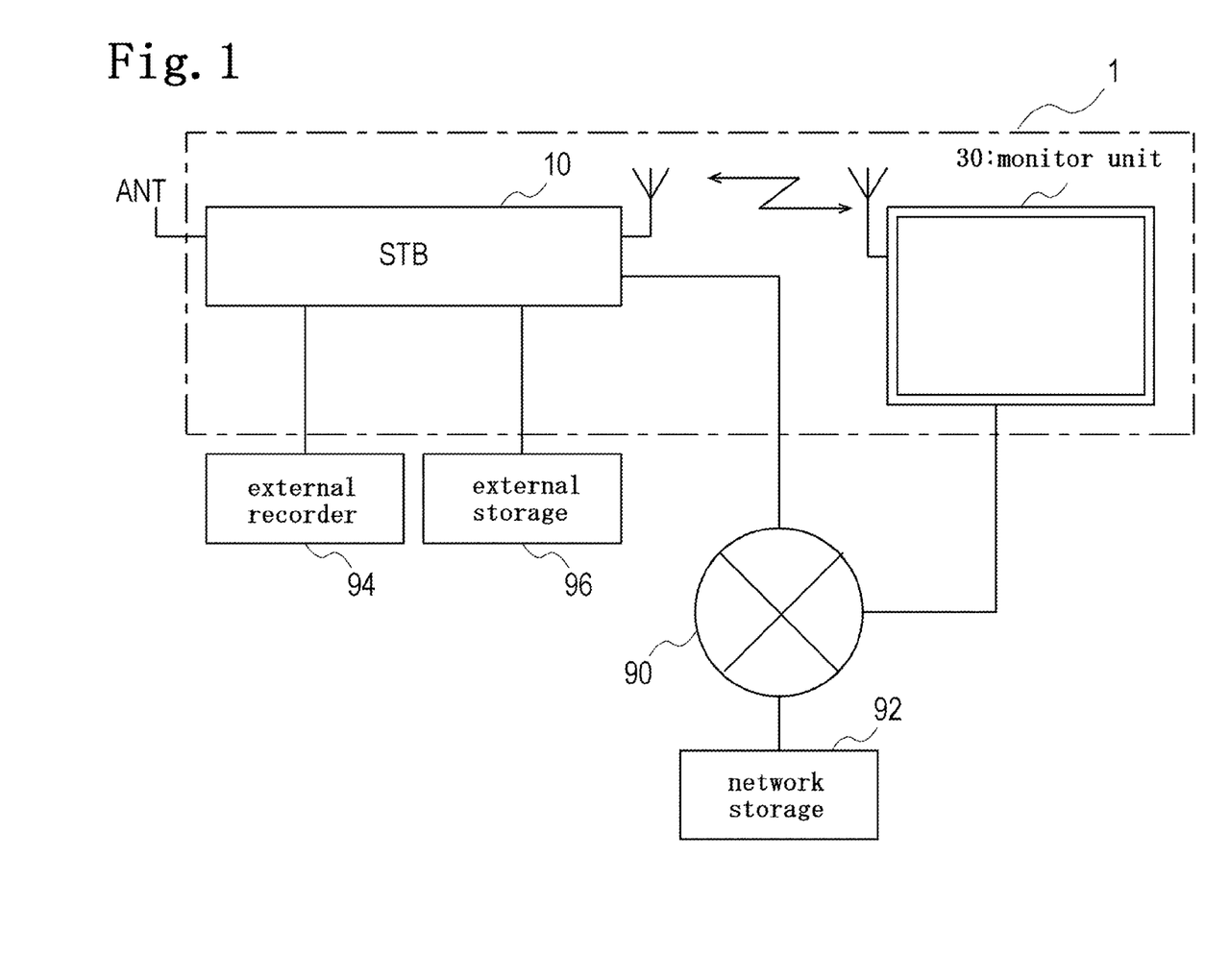
[FIG. 1] is a view showing a configuration of a location free TV according to an embodiment.

Next, description will be given specifically for modes for carrying out the present invention with reference to drawings. FIG. 1 is a view showing a configuration of a location free TV 1 according to the present embodiment. As shown in the figure, the location free TV 1 is provided with an STB 10 and a monitor unit 30 separately, as independent configurations. Specifically, for example, broadcasting (content) received by the STB 10 is wirelessly transmitted to the monitor unit 30, and displayed on the monitor unit 30. Moreover, the STB 10 is connected to an external recorder 94 and an external storage 96 in a recordable and playable state. In addition, the STB 10 is connected to a network storage 92 via a network 90 in a recordable and playable state. Note that, the STB 10 may be connected to the network 90 directly, for example, by a wired LAN or a wireless LAN. In addition, the location free TV 1 is provided with general functions, and when insufficient amount of power remains in a battery of the monitor unit 30, a program being viewed is recorded in the external recorder 94 and the like, via the STB 10.

Figure 2:
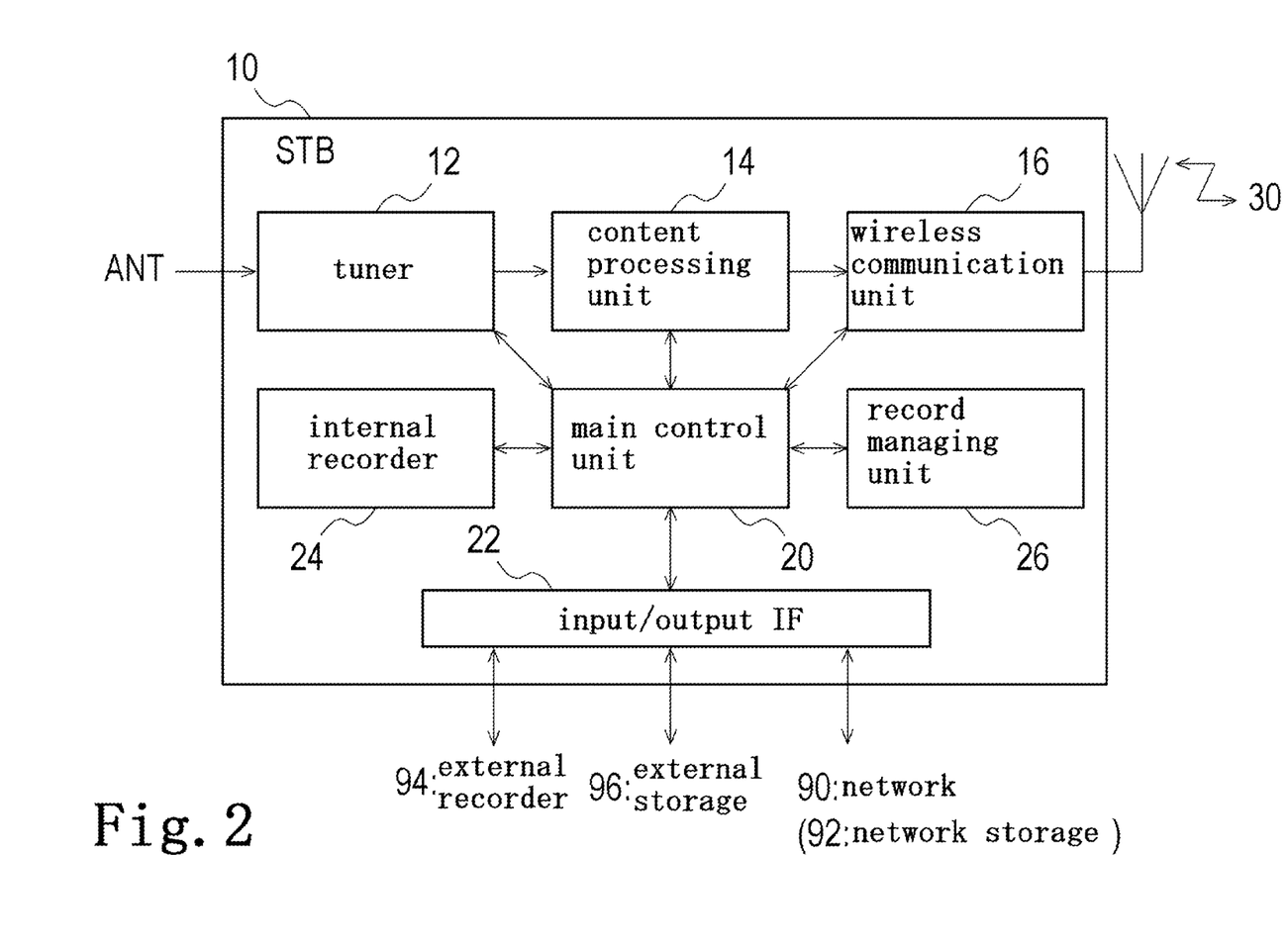
[FIG. 2] is a view showing a configuration of an STB according to the embodiment.

FIG. 2 is a functional block diagram showing a configuration of the STB 10. The STB 10 is provided with a main control unit 20 which controls each component generally, a tuner 12, a content processing unit 14, an internal recorder 24 and an input/output IF 22.

The tuner 12 receives terrestrial digital broadcasting and satellite broadcasting, and applies demodulating processing and the like to a receiving wave to extract a stream (such as TS) corresponding to a desired content. The content processing unit 14 applies decoding processing to the stream extracted by the tuner 12, and extracts a video signal, a sound signal and a data signal to generate signals for transmission (a video signal for transmission and a sound signal for transmission) to be transmitted to the monitor unit 30. Moreover, the content processing unit 14 displays the video signal and the data signal so as to be overlapped as necessary, and performs enlargement and reduction processing of a screen size and the like. Note that, when decoding processing is performed not by the STB 10 but by the monitor unit 30, the content processing unit 14 is unnecessary and a video and sound processing unit 34, which will be described below, may be provided with that function.

A wireless communication unit 16 transmits, to the monitor unit 30 by a predetermined method, the signals for transmission to the monitor unit 30 generated by the content processing unit 14. As a wireless method, for example, there is a method of the 5 GHz band in conformity with IEEE802.11n.

The internal recorder 24 is configured by being provided with an SSD (Solid State Drive) and a drive of a DVD (Digital Versatile Disk) and the like, and records and plays the broadcasting received by the tuner 12.

A record managing unit 26 manages recording and playing processing in the internal recorder 24, the external recorder 94 and the like. Though specific description will be given below, in addition to the general usage aspect, as a characteristic function of the present embodiment, in a case where an amount of power remaining in a battery of the monitor unit 30 becomes small or the like, recording processing is performed until a program ends, and when the monitor unit 30 becomes AC-driven or the amount of power remaining in the battery becomes sufficient, processing for playing the recorded content is performed.

The input/output IF 22 is an interface for connecting to an external device, and is provided with, for example, a USB interface, an HDMI interface, a wired LAN interface and the like. To this input/output IF 22, the external recorder 94, the external storage 96, and the network storage 92 are connected.

Figure 3:
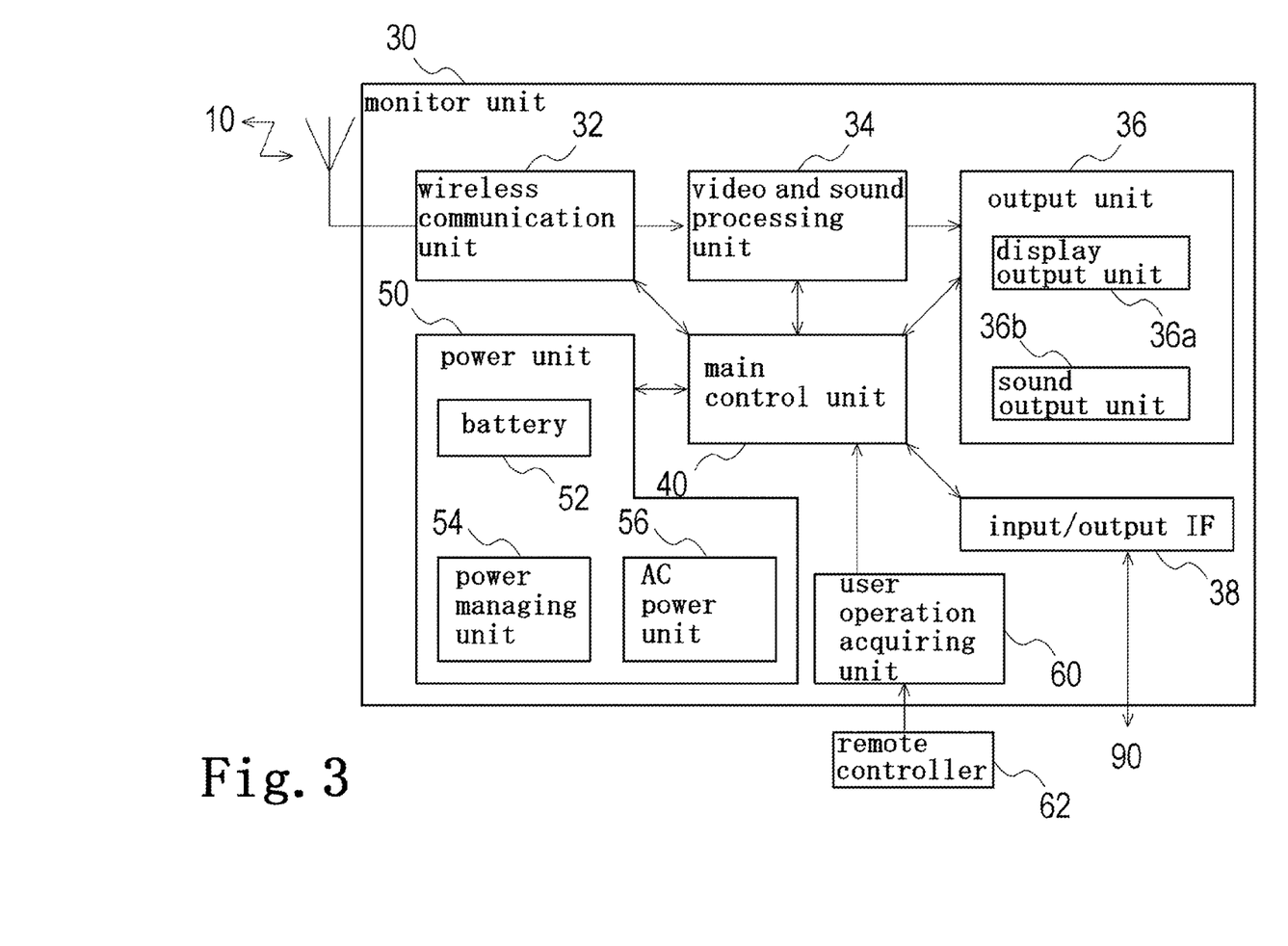
[FIG. 3] is a view showing a configuration of a monitor unit according to the embodiment.

The monitor unit 30 is provided with a main control unit 40 which controls each component generally, a wireless communication unit 32, the video and sound processing unit 34, an output unit 36, a power unit 50, an input/output IF 38 and a user operation acquiring unit 60.

The wireless communication unit 32 performs communication with the wireless communication unit 16 of the STB 10 by the predetermined wireless method described above. With this communication, contents (signals for transmission) are acquired from the STB 10. Further, transferring of information concerning recording processing according to the amount of power remaining in the battery is performed.

In the video and sound processing unit 34, decoding processing of the contents acquired in the wireless communication unit 32 and the like are performed. That is, a video signal and a sound signal are generated and output to the output unit 36. Moreover, the video and sound processing unit 34 performs buffering processing according to a communication state for smooth content output processing.

The output unit 36 is provided with a display output unit 36a and a sound output unit 36b, and outputs video and sound in synchronization. The display output unit 36a is provided with a display unit provided with a flat panel, for example, such as a liquid crystal panel or an organic EL panel. The sound output unit 36b is provided with a speaker and an amplification unit.

The power unit 50 is provided with a battery 52 such as a lithium-ion battery, an AC power unit 56 which converts AC power into DC power, and a power managing unit 54 which performs driving control and management for the battery 52 and the AC power unit 56.

The input/output IF 38 is provided with, similarly to the input/output IF 22 of the STB 10, interfaces of various standards. In the figure, a connection interface to the network 90 is exemplified. The user operation acquiring unit 60 acquires a direct operation instruction from a user or an operation instruction via a remote controller 62 to notify the main control unit 40. The main control unit 40 performs processing corresponding to the acquired operation instruction, for example, processing for changing channels, changing volume or the like.

Description will be given for recording processing when the amount of power remaining in the battery becomes small and playing processing of the recorded content according to the configuration described above, with reference to flowcharts of FIG. 4 and FIG. 5.

Figure 4:
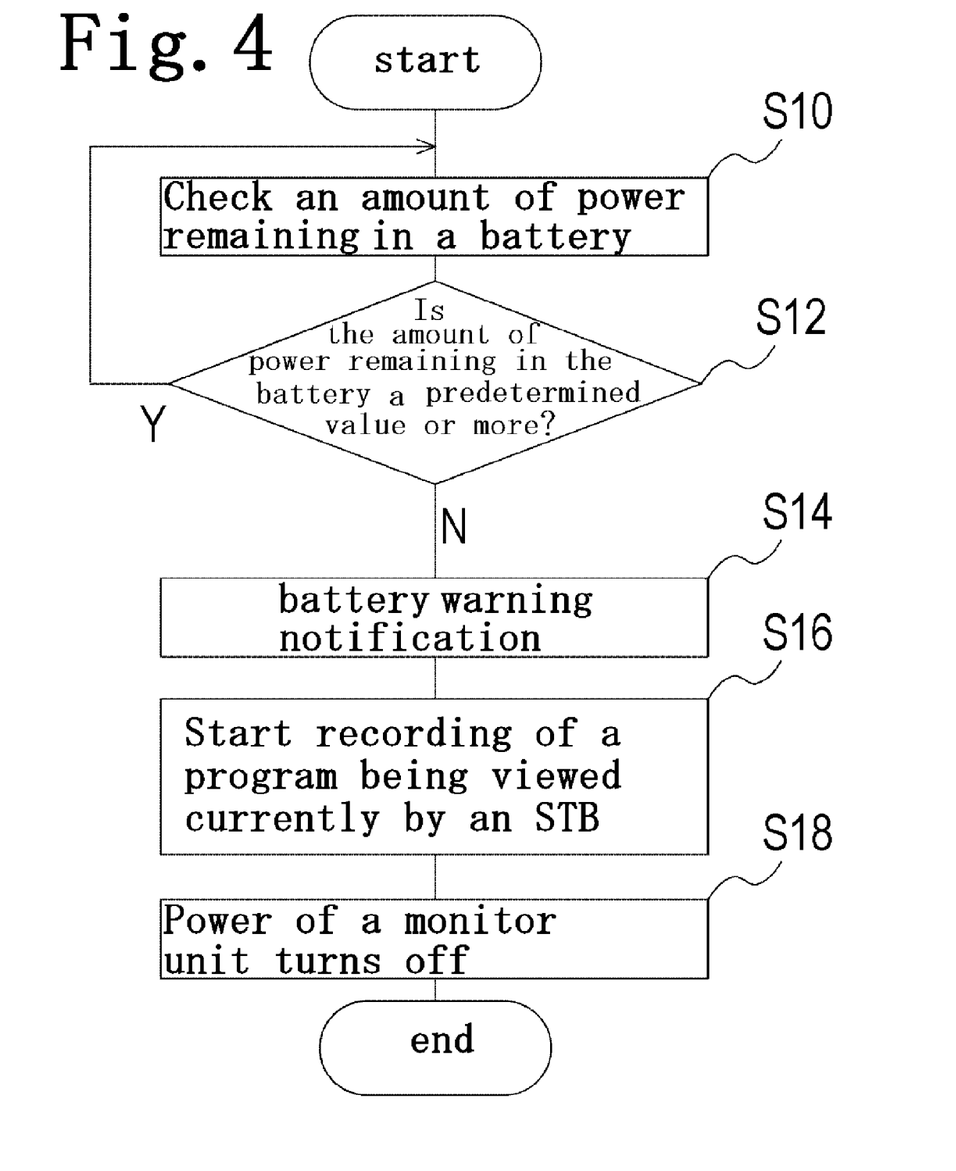
[FIG. 4] is a flowchart of recording processing when an amount of power remaining in a battery of the monitor unit becomes small according to the embodiment.

First, as shown in recording processing of FIG. 4, in the monitor unit 30, when being driven by the battery 52, the power managing unit 54 checks an amount of power remaining in the battery 52 (S10) to judge whether or not to be a predetermined value or more (S12). As the predetermined value, for example, "being 20% or more", "capacity enabling driving for 15 minutes or more", or "capacity enabling to display a program which is currently displayed to the last" are able to be exemplified. When "capacity enabling to display a program which is currently displayed to the last" is set as a judgment reference, the power managing unit 54 refers to program information (Service Information) included in a TS received by the tuner 12 of the STB 10. When the amount of power remaining in the battery is the predetermined value or more (Y at S12), the power managing unit 54 checks the remaining amount continuously. Note that, the power managing unit 54 generally performs checking of the amount of power remaining in the battery separately from this recording processing in many cases, so that the remaining amount detected by the processing may be used.

When the amount of power remaining in the battery becomes less than the predetermined value (N at S12), the power managing unit 54 notifies the record managing unit 26 of the STB 10 of battery warning notification (S14). That is, the power managing unit 54 instructs to record the content which is being output currently in the STB 10. Note that, the power managing unit 54 may only notify the detected battery capacity, and in such a case, the record managing unit 26 may judge whether or not to perform recording. That is, the judgment of whether or not to perform recording may be performed at least either the record managing unit 26 or the power managing unit 54.

The record managing unit 26 of the STB 10, when receiving the above-described notification from the power managing unit 54, starts recording processing of the content which is being displayed and output currently (S16). Specifically, the record managing unit 26 instructs a recording apparatus which is specified in advance (any one of the external recorder 94, the external storage 96 and the network storage 92) to start recording. Moreover, the record managing unit 26 records time when the amount of power remaining in the battery of the monitor unit 30 becomes zero and communication with the monitor unit 30 is interrupted (S18). Here, at a level where the amount of power remaining in the battery of the monitor unit 30 allows communication with the STB 10, when an off operation is performed by the user, the power managing unit 54 may perform processing for notifying the record managing unit 26 of that effect. In this case, the record managing unit 26 records the notification contents and the time.

Note that, the record managing unit 26 may determine a recording apparatus to be used after checking a recordable capacity of recording apparatuses which are connected. Recording is stopped when a program end time comes. Moreover, as to the above-described recording, the record managing unit 26 records the recording apparatus which was used, information (flag) to the effect of being recording responding to the case of battery exhaustion, recoding start/end time, and stop time of the monitor unit 30 in association with each other in a predetermined recording area as information of recording responding to the case of battery exhaustion.

Note that, when the recorded program is able to be displayed on the monitor unit 30 to the last or when the program is switched in the middle, the record managing unit 26 deletes recording of the program. Whether or not to perform deletion may be able to be set in advance, or may be displayed on the display output unit 36a to receive an instruction from the user. Note that, in the above-described embodiment, by the notification of the power managing unit 54, the record managing unit 26 instructs the predetermined recording apparatus to start recording, but it is needless to say that the same effect is able to be obtained even when it is configured so that recording is started at the same time with start of viewing content, and when notification is performed from the power managing unit 54, the information of recording responding to the case of battery exhaustion is recorded in the predetermined recording area.

Figure 5:
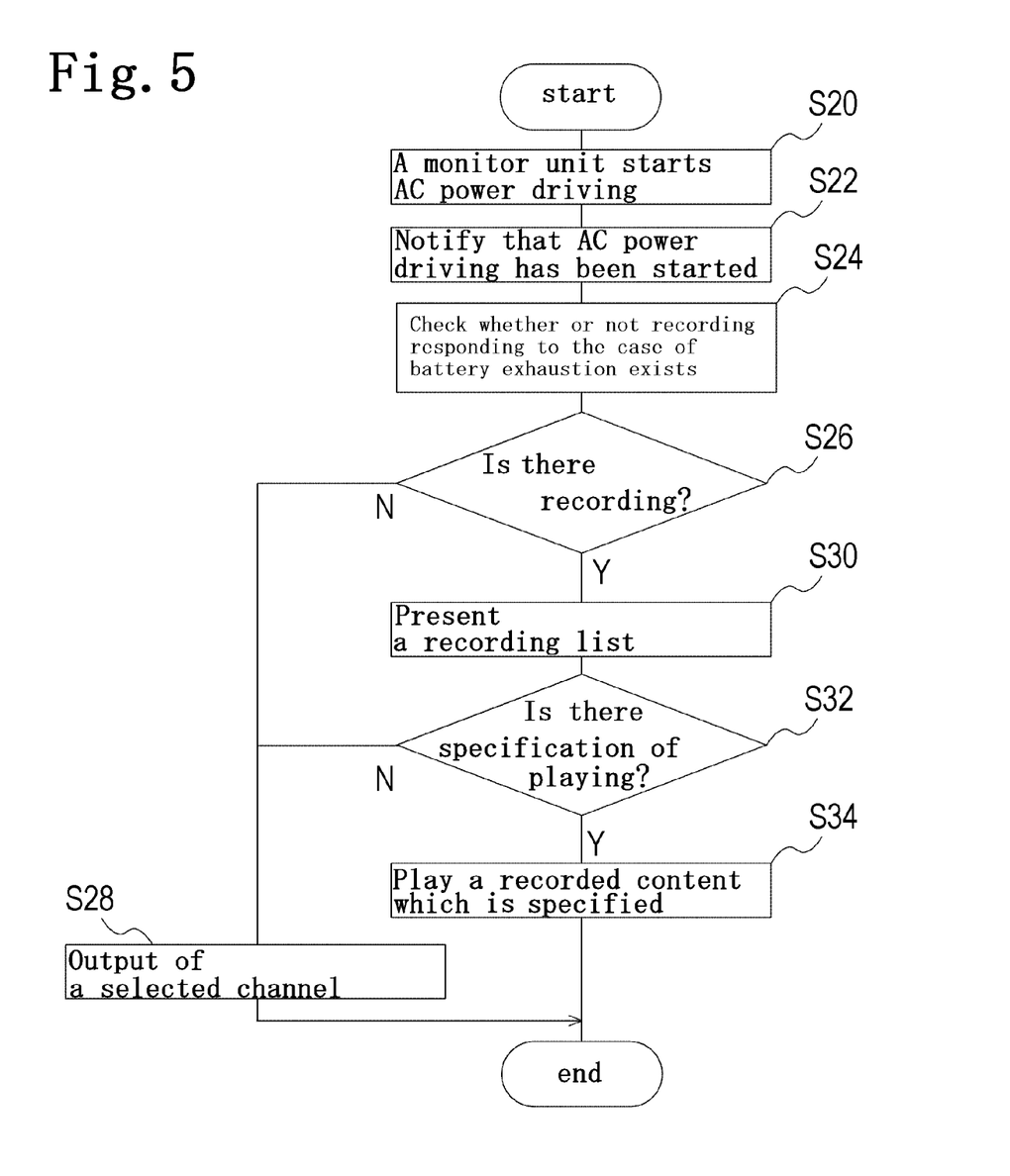
[FIG. 5] is a flowchart of playing processing when display is restarted by AC-driving the monitor unit according to the embodiment

Subsequently, description will be given for playing processing of FIG. 5. When AC driving by the AC power unit 56 is started in the monitor unit 30 (S20), the power managing unit 54 notifies the record managing unit 26 of the STB 10 that the AC driving has been started (S22).

When receiving the notification that AC driving is started from the monitor unit 30, the record managing unit 26 refers to the information of recording responding to the case of battery exhaustion to check whether or not recording responding to the case of battery exhaustion exists (S24). When there is no recording (N at S26), a program of a channel being selected is output to the output unit 36 (S28).

When there is recording (Y at S26), the record managing unit 26 generates a recording list so as to be selectable to present to the display output Unit 36a of the monitor unit 30 (S30). The recording list includes information of being recording responding to the case of battery exhaustion, recording start/end time, and a program. Note that, in the recording list, without intention of limitation to the content which was recorded most recently, contents which were recorded in the past may be displayed as a list. In this case, whether or not to have been played may be displayed together.

Subsequently, when there is no specification of playing based on the recording list from the user (N at S32), that is, when notification that playing is not to be performed is acquired from the monitor unit 30, the record managing unit 26 notifies the main control unit 40 of that effect. The main control unit 40 generates a signal for transmission of a channel which is being selected currently to transmit to the monitor unit 30. In the monitor unit 30, the signal for transmission of the channel being selected is received and output processing at the output unit 36 is performed (S28).

When there is specification of playing based on the recording list from the user (Y at S32), the record managing unit 26 receives specification of a playing position from the user to start playing processing from the specified position (S34). The specification of the playing position is, for example, specification of whether to play the recorded content which is specified from the beginning that recording is started or to play from the position of the time when the monitor unit 30 is turned off. Moreover, when the program to be played is on the air at the timing of starting playing, selection of whether or not to, what is called, "perform chasing playback" may be performed.

Hereinabove, according to the present embodiment, in the location free TV 1, even when the power is turned off in the middle of a program because of exhaustion of the batter 52 of the monitor unit 30, recording is performed in the STB 10, so that it is possible to prevent missing of broadcasting till AC driving. Moreover, by performing "chasing playback", it is possible to view the program to the last. Further, the user is able to view the program until immediately before the battery 52 of the monitor unit 30 becomes zero.

Hereinabove, the present invention has been described based on the embodiment. This embodiment provides an exemplification, and any person with ordinary skill in the art could understand that, by combining the components and processing thereof, various modifications can be created, and such modifications are within the scope of the present invention.

Figure 6:
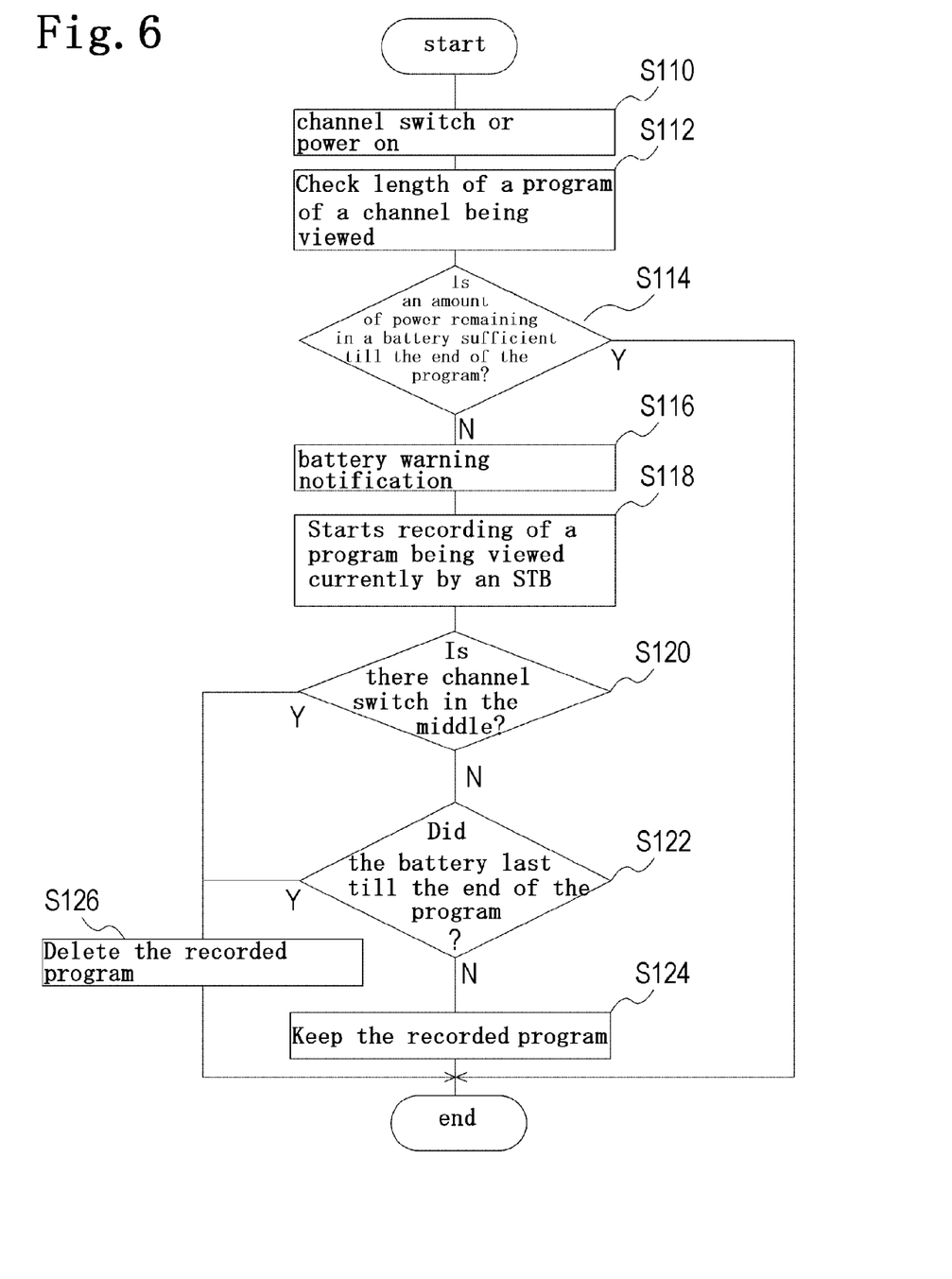
[FIG. 6] is a flowchart of recording processing when an amount of power remaining in the battery becomes small according to a modification of the embodiment.

Description will be given for such a modification with reference to a flowchart of FIG. 6. In this modification, whether or not to perform recording is judged not simply by whether or not an amount of power remaining in the battery 52 of the monitor unit 30 becomes less than a predetermined amount, but judged by whether or not display is possible to the last in the beginning of a program.

When a new program is started (S110), the power managing unit 54 checks length of the program being viewed, that is, the new program (S112). The power managing unit 54 then judges whether or not the amount of power remaining in the battery 52 is sufficient till the end of the program (S114).

When it is judged that the amount of power remaining in the battery 52 is sufficient till the end of the program (Y at S114), the processing by the present flow ends. In this case, for example, the procedure moves to the processing by the flow of FIG. 4 shown in the above-described embodiment.

When it is judged that the amount of power remaining in the battery 52 is insufficient till the end of the program (N at S114), the power managing unit 54 notifies the record managing unit 26 of the STB 10 of that effect as battery warning (S116). Upon this notification, the record managing unit 26 starts recording of a program of a channel which is being selected and viewed currently (S118). Accordingly, recording is started substantially from the beginning of the program. Note that, the above-described check of the amount of power remaining in the battery may be performed immediately before start of the program (for example, 30 seconds before or the like), and in this case, recording is able to be started without time lag.

Subsequently, when a channel switching operation by the user is performed after the recording is started (Y at S120), the record managing unit 26 performs stop and deletion of the recording (S126). Also when there is no channel switching (N at S120) and the battery 52 lasts till the end of the program (Y at S122) the record managing unit 26 performs stop and deletion of the recording (S126). When the battery 52 does not last till the end of the program (N at S122), in the same manner as the embodiment described above, the record managing unit 26 does not delete but save the recorded program with information of recording responding to the case of battery exhaustion (S124)

When the user causes the monitor unit 30 to be AC-driven, the record managing unit 26 then indicates that there is content which has been recorded on the display output unit 36a as well as indicates whether to perform playing from the beginning of the program or perform playing from the timing when the battery 52 becomes empty and power is turned off on the display output unit 36a so as to be selectable.

According to the present modification, even when the amount of power remaining in the battery 52 of the monitor unit 30 runs out in the middle of a program to interrupt display, the user is able to view again from the beginning of the program or from the timing when the program is interrupted. Note that, the above-described flow is performed at the timing when a program is newly started, but the same processing may be performed at the timing when power is turned on or the timing of channel switching.

REFERENCE SIGNS LIST 1 location free TV
10 STB
12 tuner
14 content processing unit
16, 32 wireless communication unit
20, 40 main control unit
22, 38 input/output IF
24 internal recorder
26 record managing unit
30 monitor unit
34 video and sound processing unit
36 output unit
36a display output unit
36b sound output unit
50 power unit
52 battery
54 power managing unit
56 AC power unit
60 user operation acquiring unit
62 remote controller

The invention claimed is:
1. A television receiver apparatus, comprising:
a monitor unit having portability and driven with a battery; and
a tuner unit provided separately from the monitor unit, transmission of content is performed from the tuner unit to the monitor unit,
the tuner unit including a battery managing unit for detecting an amount of power remaining in the battery provided in the monitor unit; and
the tuner unit including a record managing unit for, when the battery managing unit detects that the amount of power remaining in the battery is less than a predetermined amount, recording the content which is received by the tuner unit and transmitted to the monitor unit in a recording apparatus; wherein
when the content is recorded in the recording apparatus, the record managing unit records information of recording responding to the case of battery exhaustion in association with the recording,
when driving of the monitor unit by AC power is started, the battery managing unit notifies the record managing unit of that driving by AC power is started,
when notification of the effect that driving by AC power is started is received from the battery managing unit, the record managing unit refers to the information of recording responding to the case of battery exhaustion to check existence of recording, when there is no recording, a program of a channel being selected by the tuner unit is output to the monitor unit, and when there is recording, a recording list is output to the monitor unit.

2. The television receiver apparatus as defined in claim 1, wherein when playing of recorded content is specified from the recording list, if the content is on air, chasing playback is performed.

* * * * *